Nov. 23, 1926. 1,607,648
D. T. SHARPLES
LUBRICANT DEFLECTOR AND GUARD FOR CENTRIFUGAL SEPARATOR BOWL
SPINDLE AND GEAR CASINGS
Filed May 26, 1923

Inventor
D. T. SHARPLES.
By
Sturtevant + Mason
Attorneys

Patented Nov. 23, 1926.

1,607,648

UNITED STATES PATENT OFFICE.

DAVID T. SHARPLES, OF WEST CHESTER, PENNSYLVANIA, ASSIGNOR TO THE SHARPLES SEPARATOR COMPANY, OF WEST CHESTER, PENNSYLVANIA, A CORPORATION OF PENNSYLVANIA.

LUBRICANT DEFLECTOR AND GUARD FOR CENTRIFUGAL SEPARATOR BOWL SPINDLE AND GEAR CASINGS.

Application filed May 26, 1923. Serial No. 641,628.

This invention relates to devices for lubricating shafts rotating about a substantially vertical axis, and more particularly to means for preventing the escape of oil from the parts to be lubricated.

The general object of the invention resides in lubricating the bearing of a substantially vertical rotatable spindle, and in providing a cooperating means for preventing the leakage of lubricant down and around the spindle.

In the specific adaptation of the broad invention to the rotatable spindle of a centrifugal separator, and especially in milk separators, it is particularly desirable to prevent the escape of lubricant down or around the depending spindle to the bowl below and in such adaptation of the invention, the object resides in providing means for preventing the lubricant in the gear case from escaping through the opening therein through which the rotating bowl spindle freely depends.

Still another object of the invention resides in constructing the means for thus preventing the escape of the lubricant so that the rotatable spindle can be removed endwise through the gear case opening without detaching the lubricant deflecting means.

These and other objects will be manifest from a perusal of the following specification when taken in connection with the accompanying drawing, wherein—

Figure 1:
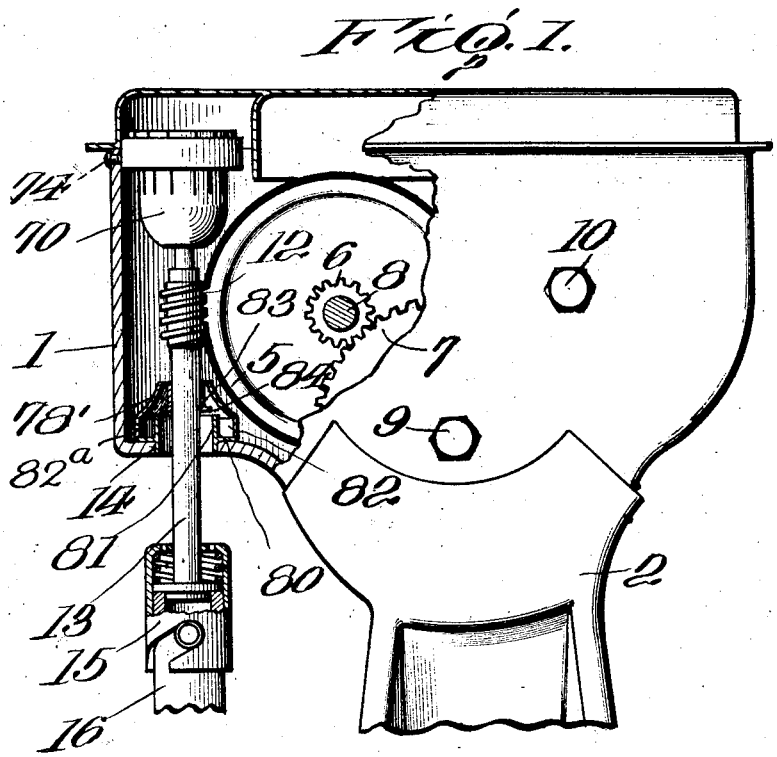
Figure 2:
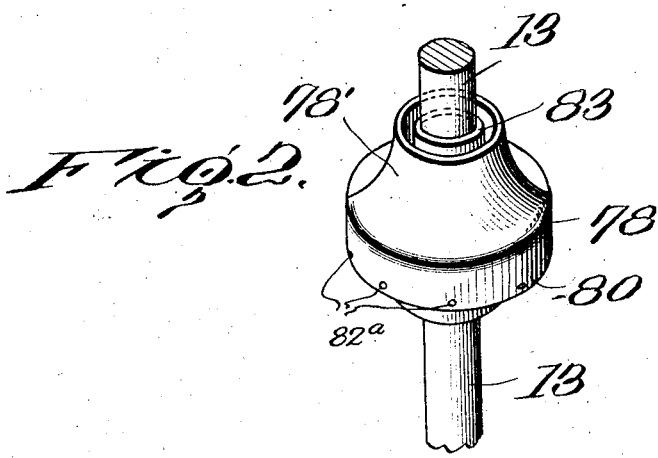

Figure 1 is a side view of the gear case broken away with the oil deflector shown in section, and Fig. 2 is a perspective view of the oil deflector mounted on the bowl spindle.

The invention which is capable of broad application is illustrated and described for purposes of explanation in connection with the depending rotatable spindle of a centrifugal milk separator of the construction set forth and claimed in the pending application filed jointly by David T. Sharples and P. M. Sharples, on August 2, 1922, Serial Number 579,200, from which application has been taken the subject matter forming the basis for the present claims.

Referring now in detail to the drawing, a standard 2 supports the upper gear case 1. This casing is shown as a pressed steel basin, not only to the end that the usual gearing for driving the bowl spindle, three of which are shown as at 5, 6 and 7, can be mounted on suitable spindles 8 and 9 passing from one side of the case to the other, but also that this case will effectively hold the lubricating oil into which the bottoms of the gears dip so as to splash the lubricant about as heretofore. By constructing this gear casing of pressed steel in one integral piece, all danger of oil leakage is obviated. The large gear 5 in the casing 1 intermeshes with the usual worm 12 rigid with the vertically depending bowl spindle 13 which is mounted in a bearing 70 attached to the upper part of the casing as at 74. This bearing forms no part of the present disclosure but forms the subject-matter of a separate application.

The hanging spindle 13 passes freely through an opening 14 in the bottom portion of the gear casing 1, which construction permits the free and unrestricted rotation of this bowl spindle. The bottom of the bowl spindle is provided with the usual type of bayonet connection 15 with the upper portion 16 of the rotating bowl, not shown.

As before stated, the vertical depending spindle 13 passes freely through the opening in the bottom of the gear case containing the lubricating oil so that the spindle is free and unobstructed in its rotation. However, it is of the utmost importance that no lubricating oil escape through this opening 14 or run down the spindle 13 into the bowl, either when the bowl is running or when it has come to rest. To prevent this, an oil deflector is located at the mouth of the opening and extends concentrically about this spindle upwardly so as to act as a shield and prevent the oil being thrown from the gears on to the revolving spindle at the opening, or out through the opening, or to prevent the oil from splattering from the rotating spindle. In connection with this shield, there is provided cooperating means for preventing the direct flow of oil down the revolving spindle 13. The preferred form of shield is shown clearly in Fig. 2 of the drawing, wherein the deflector or shield is constructed as a hollow sleeve 78. In cross section, the sleeve may be heart-shaped, the outer upper periphery 78' thereof being curved around the portion of the gear 5 and inwardly to a point slightly spaced from the spindle 13 but of sufficient distance to permit the free withdrawal therethrough of the spindle 13 and the gear 12 thereon. The base 80 of this sleeve 78 extends inwardly toward the opening 14 and thence upwardly parallel with shaft 13 as at 81. This latter portion constitutes an upstanding flange and forms with the outer portion of the base 80 a pocket 82 which is preferably provided with drain holes 82ª communicating with the gear casing so that any oil collecting in this pocket will drain back into the gear casing. Within this deflector 78 is located the oil shedder 83 which is fixed rigidly to the spindle 13. This oil shedder 83 has an outwardly projecting flange 84, which flange directs the oil outwardly under centrifugal force as the spindle rotates. The oil is thus thrown into the pocket 82 of the deflector. It is of the utmost importance that the diameter of the opening between the upper rim of the deflector 78 and the spindle 13 be not greater than the diameter of the flange 84 and also that the diameter of the opening between the flange 81 and the spindle 13, be greater than the diameter of the flange 84. This difference is very slight and is just enough for the flange to pass through the opening. This construction permits the flange 84 to pass freely into the deflector when the parts are assembled. It will be noted from this, that a straight line passing through the inner edge of the upper opening to the inner edge of the lower opening will touch or intersect the revolving flange 84. By means of this construction, it is not possible for oil to pass in a straight line from this device. Nor is it possible for oil to get between and pass or be splattered through the device.

It is obvious that minor changes in the details of construction and the arrangement of the parts may be made without departing from the spirit of the invention as set forth in the appended claims.

Having thus described the invention, what I claim as new and desire to secure by Letters Patent, is—

1. The combination of a lubricant containing casing, a shaft depending freely through an aperture in said casing, an oil shedding flange on said shaft, a substantially tubular oil deflector surrounding said flange in spaced relation therefrom, and having portions above and below said flange extending inwardly toward said shaft, the diameter of the lower portion being greater than the diameter of the flange.

2. The combination of a lubricant containing casing, a shaft depending freely through an aperture in said casing, a flange on said shaft above said aperture, a substantially tubular oil deflector surrounding said flange in spaced relation therefrom and having portions above and below said flange extending inwardly toward said shaft, the diameter of the upper portion of said deflector being not greater than the diameter of said flange and the diameter of the lower portion of said deflector being greater than the diameter of the flange.

3. The combination of a substantially vertically disposed rotatable spindle, a bearing at the upper end thereof for suspending said spindle, a casing housing said bearing and supporting the same and having an opening through which the spindle extends, means carried by the casing for preventing oil from being thrown through the opening by the operating gears for the spindle, and means carried by the spindle for preventing the oil accumulating on the spindle from running down on said spindle through said opening, said means on the spindle being located within the means for protecting the opening in the casing from the oil thrown by the gears and of such dimensions that said means on the spindle can be passed through the means for protecting the opening in the casing when the parts are assembled.

In testimony whereof, I affix my signature.

DAVID T. SHARPLES.